United States Patent

[11] 3,569,681

| | | |
|---|---|---|
| [72] | Inventor | Richard W. Koepcke<br>San Jose, Calif. |
| [21] | Appl. No. | 646,273 |
| [22] | Filed | June 15, 1967 |
| [45] | Patented | Mar. 9, 1971 |
| [73] | Assignee | International Business Machines Corporation<br>Armonk, N.Y. |

[54] METHOD AND SYSTEM FOR ADAPTIVE CONTROL
9 Claims, 2 Drawing Figs.

[52] U.S. Cl. .................................................. 235/150.1,
          235/151.1
[51] Int. Cl. .................................................. G05b 13/02
[50] Field of Search .......................................... 235/150.1,
          151.12, 150.22

[56] References Cited
UNITED STATES PATENTS

| 3,216,676 | 11/1965 | Brown et al. ................ | 244/77 |
| 3,446,946 | 5/1969 | Andeen ....................... | 235/150.1 |
| 3,184,686 | 5/1965 | Stanton ....................... | 235/150.1(X) |

Primary Examiner—Eugene G. Botz
Attorney—Fraser and Bogucki

ABSTRACT: Adaptive control methods and systems are provided that utilize the relationship between at least one operative criterion of system performance and at least one reference to control the use of one of at least two control laws which establish different operative zones, which are stochastic and deterministic in character. The different control laws used in these two zones provide wide bandwidth under conditions of large signal excursion (deterministic zone), and stability and linearity when the system is at or near the set point (stochastic zone). The error signal may comprise the chosen system performance criterion, and the chosen control laws may differ by using different controller coefficients or by using different samples of system operation. Preferably the switchover point is set with respect to a given multiple of the standard deviation of the noise terms in an equation descriptive of the system, such that the signal excursion is identified with a high degree of probability as being of non-noise origin.

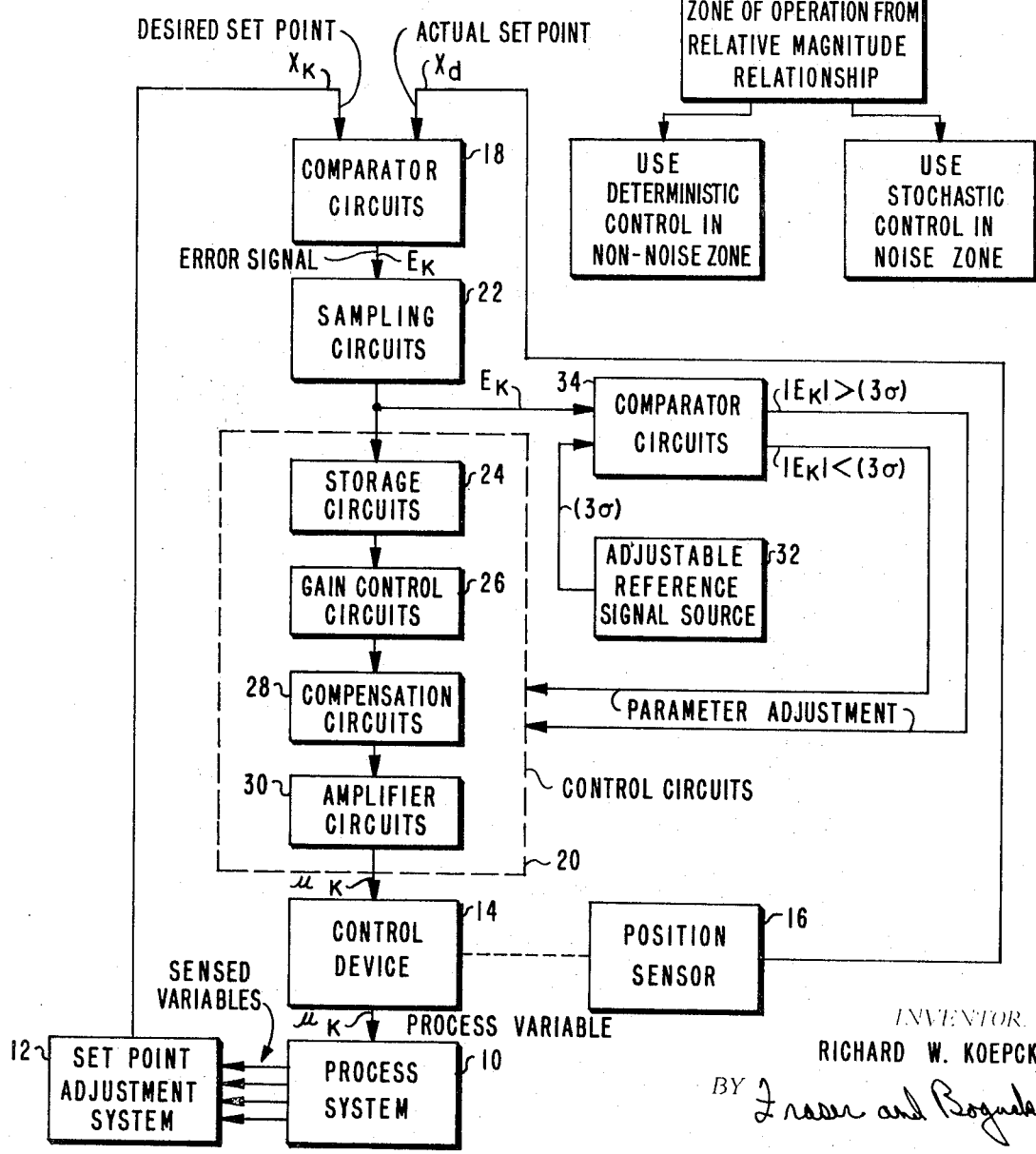

METHOD AND SYSTEM FOR ADAPTIVE CONTROL

BACKGROUND OF THE INVENTION

1 Field of the Invention

This invention relates to control systems and more particularly to systems of the type that adapt their operating characteristics to the conditions under which they operate.

2 Description of the Prior Art

The type of response which a control system exhibits is affected by many factors, including system gain and various disturbances, both external and internal. With conventional control systems, a desired overall response is achieved by setting predetermined gains in individual control loops and by providing control or command signals derived in accordance with a number of measured variables. If the control law for the control system is adjusted to provide optimum response for typical conditions, however, it is inherent that there is some sacrifice of response or performance under nontypical conditions. In a process control system, for example, noise excursions arise from a variety of sources and both transient and steady state conditions must be responded to appropriately. Typically, compromises must be made between performance, control loop complexity, and the amount of effort that can be expended in analyzing system parameters, even if only steady state conditions are considered.

Adaptive controls have been utilized to enable control systems to provide satisfactory performance under a number of conditions. In broad terms, an adaptive control system observes in some manner the performance of the system under control, and modifies the governing criteria, simply or in a complex fashion, where necessary and possible to achieve better system performance. In more advanced modern systems, a number of process variables are sensed and interrelated in accordance with a specified control law and to generate a control signal. The governing control law is modified in some fashion to generate a new control signal when by determination it is found that particular conditions exist under which improvement is feasible. Simple examples of adaptive controls are found in analogue systems having two modes of operation. In some such systems, depending upon predetermined criteria, the system may shift automatically from proportional control to a combination of proportional and reset control when there is a substantial excursion in a variable or in an error signal. In analogue systems, circuits may be incorporated that automatically function in a different fashion when conditions change. Thus, in servosystem design it is known to utilize nonlinear impedances to adjust system time constants in accordance with the magnitude of an error signal.

Such systems represent rudimentary forms of adaptive control, but the art in general tends toward the utilization of adaptive control in more complex environments. Particular examples may be found in the operation of integrated industrial plants with multiloop control systems, each of the loops being operated in accordance with its own control equation related to particular variables. Adaptive control has greatest potential for such applications if a given system may be used to operate any of variety of similar or dissimilar processing or fabricating installations with a minimum of adjustment and modification, but in accordance with desired control criteria.

SUMMARY OF THE INVENTION

Systems and methods in accordance with the invention modify the manner in which a control system operates in accordance with the present and past performance of the system itself. At least two zones of operation are identified, based upon the conditions in the system and their relationship to system operation. In a deterministic zone, error signal excursions are treated as other than noise originated, and a control law is followed that primarily depends upon immediate conditions. In a stochastic zone, a control law is exercised that places greater emphasis on prior system history. More than two zones may readily be employed. A desired overall response characteristic is thus imposed on the control system, the system operating with chosen sensitivity, stability, and speed of response in each zone. The switchover point between the zones is identified by monitoring a system variable, such as the error signal, and comparing it to a predetermined or successively established criterion related to the noise characteristic of the system.

This invention includes new methods of interrelating measured and calculated variables in a process, the measured variables including a number of past variables in at least some instances. It involves taking a series of physical measurements, performing certain mathematical operations on the values obtained by these measurements and then adjusting certain variables in accordance with the results obtained from the computation. The invention does not comprise a computer program for performing the computation, but is a control technique, or more explicitly, a method of adjusting the setting of a process variable in accordance with signals obtained from the process being controlled.

In one specific example of a system in accordance with the invention, a closed loop controller that is externally set by an associated system is operable in accordance with at least two different control laws, each establishing different control criteria. Signal values representative of one or more performance criteria for the controller are sampled at successive points in time. The chosen criterion is compared to a selected switchover reference value, this value preferably but not necessarily being a value equivalent to approximately three times the standard deviation of system noise. The relative magnitude relation of the criterion to the switchover reference value controls selection of variables that alter the applicable control law. In a preferred example, the control coefficients are varied to operate a two-term controller in such fashion as to observe selected control criteria in each zone of operation.

BRIEF DESCRIPTION OF THE DRAWING

Objects and advantages other than those indicated above will be apparent from the following description, taken in conjunction with the accompanying drawing, in which:

FIG. 1 is a block diagram of steps utilized in a method in accordance with the invention; and FIG. 2 is a block diagram representation of a system in accordance with the invention.

Detailed DESCRIPTION OF THE INVENTION

As is evident to those skilled in the art, fundamentally different behavior is required when a control system operates in response to large signal excursions as opposed to small signal excursions that may essentially comprise noise. More precisely, when a system operates in a "deterministic" zone in which signal excursions substantially exceed probable noise components, high response speed and wide bandwidth are required. Thus, the system appropriately responds to a step input of substantial amplitude. When the system operates in a "stochastic" zone, in which noise components are of magnitudes comparable to the error signal, the system would generally tend to be unstable if it had comparable response characteristics. The desired responses in each zone may follow different control criteria, but the difference, generally speaking, between actual and desired settings should be reduced substantially linearly with time. Although the terms "stochastic" and "deterministic" are widely used with respect to control systems, no definitive line of demarcation can be drawn between them, and they are used herein in the broad and general senses in which they have become accepted.

FIG. 1 illustrates an exemplary method in accordance with the invention, by which chosen control criteria are observed in controlling the setting of a process variable. In the typical control system, the system receives a desired set point value and adjusts a control device that governs the process variable. Means are provided to return a signal representative of the actual set point value, and the difference between the desired and actual values is used to generate an error signal from which the control correction is exercised. Methods in accordance with the invention properly utilize the stochastic and deterministic zones in such a control context, dependent upon the probability that a noise-generated signal excursion exists.

In exercising adaptive control in accordance with the invention one or more selected performance criteria for the controller are first monitored. The performance criterion preferably comprises the amplitude of the error, and is time sampled for purposes of subsequent successive comparisons.

Independently, at least one reference is established to represent one or more zone switchover points or regions corresponding to one or more ranges of deviation of the selected performance criterion. A single reference is assumed for ease of description. This reference may be fixed or adjustable, and may be related to a single parameter or a number of variables. It may be of time-varying form, successively established from the relationship of chosen system parameters. Preferably, however, it has a selected relationship to the system noise, such as to distinguish deviations in the selected performance criterion as being nonnoise in origin.

The system noise is here assumed to be Gaussian in character, as is generally the case. Therefore, the probability that an excursion of a given amplitude in a chosen performance criterion represents noise can be related mathematically to the Gaussian distribution curve.

Consequently, methods in accordance with the invention establish at least one zone switchover point or region representative of noise probability as related to the controller characteristics. Some understanding of the nature of noise and its relation to a control system will be helpful in definition of this relationship.

A model of a control system may be described by a fundamental discrete equation having the form:

$$x_{k+1} = ax_k + bu_k + D \quad (1)$$

where $x$ is the output
$u$ is the input
$k$ denotes the $k^{th}$ sampling instant
$a$, $b$ and $D$ are constants In equation (1) the constant $a$ represents, broadly speaking, the open-loop time constant and the value $\frac{b}{1-a}$ the open-loop gain. The constant $D$ represents the steady state bias of the operating point.

This model approximates system behavior more accurately if the various noise factors are concurrently considered, including input, internal and observation noise. Each noise component includes short term variations, but the noise is independent of input and output values. Input noise, $n_1$, acting alone may be represented as a relatively slow cycle-type type of variation about the operating point. Internal noise, $n_2$, introduces a drift or essentially DC shifting in the operating bias level. Observation noise, $n_3$, has the characteristics of white noise. It may be assumed that for a sufficiently large time interval, $N$, the noise averages to zero, i.e., $$\frac{1}{N} \sum_{k=1}^{N} n_{ik} \approx 0 \quad (2)$$

where $i = 1$, 2 or 3 in correspondence to the similarly designated types of noise.

The assumption that the noise is essentially Gaussian in character is based on practical operative experience. A reference value representative on nonnoise excursions can be established statistically in terms of standard deviation $\sigma$. Inasmuch as in excess of 99.7 percent of noise falls within a valve of $3\sigma$ with a Gaussian distribution, this approximate value is conveniently chosen for discussion, but greater or lesser values may be used in accordance with the system model and desired conditions. Therefore, for all $n_{ik}$ $$|n_{ik}| < 3\sigma_i \quad (3)$$

In accordance with the analysis set forth in an article of R. W. Koepcke in Control Engineering for Jun. 1966, pages 83—89, the noise terms $n_1$, $n_2$, and $n_3$ are added into equation (1) to more closely approximate the system, as follows:

$$x_{k+1} = ax_k + bu_k + n_{1k}$$
$$d_{k+1} = d_k + n_{2k}$$
$$z_k = x_k + n_{3k}$$

where $z$ is the observed reading of $x$, modified by $n_3$.

By recasting the above equation (3) so as to express the output in terms of $E_k$, as $E_k = z_k - x_d$, with $x_d$ being the desired or set point value, and postulating a single noise term $V_k$ having the same properties as $n_{ik}$, a convenient model of system operation is derived having the form:

$$E_{k+1} = (1+a) E_k - aE_{k11} + b u_k + V_{k+1} + c_1 V_k + c_2 V_k - 1 V_{k11}$$
(4)

where $u_k = V_k - U_{k11}$ and $c_1$ and $c_2$ are constants. Therefore, having an understanding of the system noise characteristic in these terms a 3 $\sigma$ value may be selected as a reference for repetitive comparison to the chosen performance criterion. When the relative magnitude relation indicates that a system perturbation exceeds $3\sigma$, deterministic control is used. When on subsequent testing the relative magnitudes are opposite in sense, stochastic control is used.

It is preferred to use adaptive control laws so as to effect a predetermined modification of controller response in each zone. For example, two term control may be used in each zone, with the control coefficients being varied so that desired control criteria are observed. Gain may be varied, as may some other factor affecting the time constant. The sampled criterion of system performance may also be stabilized or averaged, either by changing the rate of sampling or providing the equivalent of numerical averaging. Those skilled in the art will recognize that both analogue and digital expedients may be employed for these purposes in accordance with the method. In any event, these alternative steps provide substantially immediate response to large signal excursions and linear and stable response to minor error excursions without substantial response to noise. There is in effect different discrimination against noise in the two operating zones, with the ultimate result being a shaping of the overall response to the desired characteristic.

SYSTEM

A digital controller in accordance with the invention is described in conjunction with FIG. 2, in which there is represented only one of a number of control loops in a control arrangement for a process system 10. In conventional fashion, a number of sensed variables, such as rates and levels, are monitored and interrelated in a set point adjustment system 12. This system 12 may take one of the forms well known in the art, such as an analogue or digital equation solver. In modern practice, control of set point values within a number of loops is generally accomplished by operating the adjustment system 12 on a time sharing or multiplex basis, with each loop being adjusted in turn or on a controlled command basis. For simplicity, and because additional loops may be arranged in like fashion or differently, only one loop is shown. Conventional conversion (ADC and DAC) circuits also have been omitted for brevity, but their use will be understood.

In the control loop, a control device 14, e.g. a valve actuator or burner control, that governs some process variable (such as flow rate or temperature) in the process system 10 is to be set to a valve desired for the associated process variable. It is desired that the control be of the closed loop and adaptive-type; the former condition is satisfied by referencing the actual set point derived from a position sensor 16 to the desired set point in comparator circuits 18. The resultant error signal is processed by control circuits 20 that, in conventional servo systems, vary the output signal driving the control device 14 so as to tend to maintain the set point at the chosen valve. An adaptive-type of control is desired in order to maintain proper regulation under load and noise disturbances without the use of complex and expensive servos and control mechanisms in the loop.

In accordance with the invention, therefore, a sampled data arrangement is provided in which a chosen criterion of system performance, here the error signal $E_k$, is repetitively sampled and its characteristics monitored to provide the basis for system adaptation. The data sampling circuits 22 may be analogue or digital amplitude responsive circuits that operate repetitively on a fixed or variable time base. Whether an analogue or digital error signal value is used the control circuits 20 perform the essential function of converting the instantaneous value of the error signal $E_k$ to an output signal $V_k$, incorporating appropriate gain and damping and such lead-lag compensation as is desirable, during the conversion. The principal functional results achieved within the control circuits 20 are shown for ease of understanding as being effected seriatim by separate functional units 24, 26, 28, 30, even though it will be recognized that these results are generally derived in highly interrelated fashion. Thus, the time-sampled error signal is received in storage circuits 24 used for signal retention and averaging even though no storage per se is needed for a continuous signal and averaging may be provided by integrating the output signal. Similarly, the functions of the gain control and compensation circuits 26, 28 respectively, are generally accomplished in integrated fashion, even in some instances in conjunction with output amplifier circuits 30.

This separation of functions is, however, useful in illustrating that the manner in which adaptive control realized in accordance with the invention may be widely varied at the option of a designer. Thus applied control signals for varying the applicable control law are designated simply "parameter adjustment."

In a preferred example, however, these signals are applied to compensation circuits 28 to modify the applicable control law by activating different coefficient values. The coefficient values chosen in this practical example may be termed controller constants, $p_1$ and $P_2$, and the control circuits 20 may provide a two-term control function of the form:

$$u_k = -p_2 E_k + (P_1 + P_2) \sum E_k \qquad (5)$$

A two-term controller provides a degree of compromise between the need for appropriate speed of response to error (determined by the term $P_2 E_k$) and the need for damping against the effects of spurious perturbations (determined by the term $P_1 + p_2\ \epsilon E_k$). It has been shown that for a chosen criterion of response for a system, different controller constant values must be used, in terms of the coefficients in the equation for the system model (4). Thus, if the criterion of response is that after any perturbation $E_{k+1} = BE_k$, where $B<1$, then the controller constants are:

$$p_1 = \frac{1}{b}[B - (1+a)] \qquad (6)$$

$$p_2 = \frac{1}{b}(a)$$

These values provide optimum stability, speed of response and sensitivity for the system under the stated criterion of response, which assumes that noise perturbations are insignificant (i.e., that the perturbation is of nonnoise origin). When the system is operating on or near set point, however, noise is obviously a predominant factor. In such situations it is usually preferred to utilize some other control criterion, such as seeking to minimize the sum of the errors squared, in the form $$J = \lim_{N \to \infty} \frac{1}{N} \sum_{k=1}^{N} E_k^2 \qquad (7)$$

Here is has been shown that the controller constants are:

$$p_1 = -\frac{1}{b}(1 + a + c_1) \qquad (8)$$

$$p_2 = \frac{1}{b}(a - c_2)$$

The significance of the noise coefficients $C_1$ and $c_2$ in equation (8) should be contrasted with the prior equation (6), in which noise coefficients are not employed. System response can advantageously be adapted not only to provide two-mode operation, but to establish superior controller characteristics in each mode. In accordance with the invention, adaptive control is realized by making parameter adjustments in accordance with the comparative relationship of the error signal to some multiple of the standard deviation of the nose term, such as $3\sigma$. The sampled error signal is applied, along with the $3\sigma$ signal derived from an adjustable reference signal source 32, to relative amplitude comparator circuits 34. Dependent upon the relative amplitude relationship between the absolute value of the error signal and the reference signal value, one of two control lines is activated. Each control line activates a different control network (not shown in detail), effectuating the appropriate control law for stochastic or deterministic control. Typically, only a relatively few components are affected in shifting between controller constants, but so many variations are feasible that no specific circuits are shown.

For example, different controller response may also result from modifying only system gain at the zero switchover point. Alternatively, the number of error signal samples may be varied in a system such as that of FIG. 2, in which the error signal is time sampled. Consequently, at the zone switchover point, in moving in the direction in which perturbations are likely to be of noise source origin, a greater number of error signal samples may be taken to minimize noise effects. At the same time the sampling rate may be increased.

Three or more control modes may be used in accordance with the invention but the two mode system is shown because it is more readily appreciated. Of course, in the equation (4) for the system model the constants $a$, $b$ can be general operations, operating on $V_k$ and $X_k$. With such general operators the mathematical arguments still apply.

A further advantageous consideration derived from this system is that it affords a ready means for defining a deadband where controller characteristics warrant. Thus, where only observation noise ($n_3$) is of significance, the $c$-coefficients may be given the values:

$$c_1 = -(1+a) \qquad (9)$$
$$c_2 = a$$

At these values, the controller constants $p_1$ and $p_2$ become zero, so that close to the operating point noise is effectively ignored by setting the controller gain at zero with the knowledge that an adequate response speed is available for a substantial error signal level.

It should be understood that the embodiment of the invention shown herein is subject to various modifications which are entirely within the spirit of the invention. For example, the control loop which includes control device 14, position sensor 16, comparator circuit 18, sampling circuit 22 and control circuits 20 could, in essence, be a conventional analogue controller or one loop in a direct digital control (DDC) system. Set point adjustment system 12 could, for example, be a supervisory controller which receives a plurality of signals from a process and which adjusts the set point for an analogue controller. The present invention relates to the technique or method whereby certain parameters in the above described control loop are adjusted. In particular, two modes of adaptive control are used. The first mode is used when the error signal is relatively large, and the second mode is used when the error signal is relatively small. The adaptive technique that is used when the error signal is small takes into account a large number of past values and the adaptive technique used when the error signal is large takes into account only a small number of past values. Many adaptive control techniques are known in the art and many of these could be utilized to practice the present invention. An embodiment within the scope of the present invention could be built utilizing a control loop with one or more variable parameters and two of the adaptive systems shown in copending application Ser. No. 609,415 (IBM Docket SA 966006), which is assigned to the assignee of the subject application. One of the adaptive systems would be used when circuit 34, shown herein, indicates that the error signal is large, and the second adaptive system would be used when circuit 34 indicates that the error signal is small. In the adaptive system used when the error signal is large, only a small number of past values would be taken into account (i.e., the performance criterion generator would be reset at relatively short time intervals), and in the adaptive system used when the error signal is small, a large number of past values would be taken into account (i.e., the performance criterion generator would be reset at relatively short time intervals, and in the adaptive system used when the error signal is small, a large number of past values would be taken into account (i.e., the performance criterion generator would be reset at relatively large time intervals). the adaptive technique shown in copending application Ser. No. 389,679 (IBM Docket 18247), which is assigned to the assignee of the present invention, could be used as the adaptive technique which takes into account a large number of past values in a system operating according to the present invention. The particular details of the adaptive techniques used are not particularly relevant to the present invention except to the extent that different adaptive techniques are used dependent on the magnitude of the error signal and to the extent that the adaptive technique used when the error signal is small takes a relatively large number of past error signal values into account whereas the adaptive technique used when the error signal is large takes only a relatively few past values of error signals into account.

While the invention has been particularly shown and described with reference to a preferred embodiment thereof, it will be understood by those skilled in the art that the foregoing and other changes in form and detail may be made therein without departing from the spirit and scope of the invention.

I claim:

1. The method of operating a control system having a determined noise characteristic comprising the steps of establishing an error signal reference level in accordance with the noise characteristic, monitoring the error signal, comparing the error signal to the reference level, operating the system in accordance with one control law when one relative magnitude relationship exists, and operating the system in accordance with a second control law when a second magnitude relationship exists.

2. The invention as set forth in claim 1 above, where the error signal reference level is set in correspondence to a value of approximately three times the standard deviation of the noise, and wherein the two control laws are selected to provide an overall response that varies with time substantially linearly with the error signal.

3. A method of adjusting the setting of a process variable in a control system that includes the steps of:
    comparing excursions of a selected criterion of system performance to a reference, said reference corresponding to approximately three times the standard deviation of noise for the system;
    adjusting the setting in accordance with a first control law when a first comparative relationship exists;
    and adjusting the setting in accordance with a second control law when a second comparative relationship exists, the second control law providing a different system response than the first.

4. The invention as set forth in claim 3 above, including in addition the step of repetitively sampling the selected criterion of system performance, and wherein the first control law provides a deterministic zone of operation when the selected criterion is greater than the reference, and the second control law provides a stochastic zone of operation when the selected criterion is less than the reference.

5. An adaptive control system for adjustment of a process variable in accordance with a predetermined response characteristic and comprising:
    a control device responsive to an output signal and adjusting the process variable;
    reference signal generating means defining a selected reference value;
    set point adjustment means providing desired set point values for said adaptive control system;
    comparator circuits responsive to the difference between actual and desired set point values for said control device for generating an error signal;
    relative magnitude comparator circuits receiving said error signal and said reference signal and providing signals indicative of the relative magnitude relationship thereof and representative of different zones of operation; and
    control circuits coupled to receive said error signal and signals indicative of relative magnitude relationship and providing differently varying selected output signals to said control device dependent upon the relative magnitude relationship.

6. An adaptvie control system for adjustment of a process variable in accordance with a predetermined response characteristic, said system having a known noise standard deviation $\sigma$, and comprising:
    a control device responsive to an output signal and adjusting the process variable;
    reference signal generating means defining a selected reference value corresponding to approximately $3\sigma$;
    set point adjustment means providing desired set point values for said adaptive control system;
    position sensor means responsive to the operation of said control device for providing actual set point values;
    comparator circuits responsive to the difference between said actual and desired set point values for generating an error signal;
    relative magnitude comparator circuits receiving said error signal and said reference signal and providing parameter adjustment signals indicative of the relationship thereof and representative of different zones of operation; and
    control circuits including parameter adjustment elements coupled to receive said parameter adjustment signals and providing output signals to said control device.

7. The invention as set forth in claim 6 above, wherein said control circuits in accordance with a two-term control function having different control coefficients, and wherein said parameter adjustment signals activate different sets of said control coefficients to provide different control criteria for the different zones of operation.

8. The invention as set forth in claim 7 above, wherein said zones include a deterministic zone in which the control criterion is such that the error signal is varied substantially linearly with time, and a stochastic zone in which the control criterion is such as to tend to minimize the sum of the errors squared.

9. A method of adjusting the setting of a process variable that includes the steps of:
    measuring said variable;
    generating an error signal which represents the difference between the measured value of said variable and the desired value of said variable;
    controlling said variable in response to said error signal and in accordance with a control law which has certain parameters;
    comparing the magnitude of the error signal to a predetermined magnitude;
    adjusting said parameters in accordance with a first adaptive law when said error signal is smaller than said predetermined magnitude, said first adaptive law taking into account a relatively large number of past values; and
    adjusting said parameters in accordance with a second adaptive control law when said error signal is greater than said prespecified magnitude, said second adaptive control law taking into account a relatively small number of past values.